(12) United States Patent
Gluhovsky et al.

(10) Patent No.: US 8,296,177 B2
(45) Date of Patent: Oct. 23, 2012

(54) METHOD FOR GENERATING FORECASTING LANDSCAPES

(75) Inventors: Ilya Gluhovsky, Daly City, CA (US);
Raja Velu, Manlius, NY (US);
Anantharaman Nagarajan, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1282 days.

(21) Appl. No.: 12/034,616

(22) Filed: Feb. 20, 2008

(65) Prior Publication Data
US 2009/0210288 A1 Aug. 20, 2009

(51) Int. Cl.
*G06Q 10/00* (2012.01)
(52) U.S. Cl. ........... 705/7.31; 705/7.23; 705/7.29; 705/7.35; 705/14.43; 705/14.46
(58) Field of Classification Search ........ 705/7.11–7.42, 705/14.1–14.73
See application file for complete search history.

(56) References Cited

U.S. PATENT DOCUMENTS

| | | | | |
|---|---|---|---|---|
| 2003/0135460 | A1* | 7/2003 | Talegon | 705/40 |
| 2004/0267612 | A1* | 12/2004 | Veach | 705/14 |
| 2006/0095336 | A1* | 5/2006 | Heckerman et al. | 705/26 |
| 2007/0156514 | A1* | 7/2007 | Wright et al. | 705/14 |
| 2007/0179845 | A1* | 8/2007 | Jain | 705/14 |
| 2008/0275757 | A1* | 11/2008 | Sharma et al. | 705/10 |
| 2011/0015988 | A1* | 1/2011 | Wright et al. | 705/14.42 |

OTHER PUBLICATIONS

Thomas F. Coleman and Yuying Li, "An Interior Trust Region Approach for Nonlinear Minimization Subject to Bounds", SIAM J. Optimization, Copyright 1996 Society for Industrial and Applied Mathematics, vol. 6, No. 2, pp. 418-445, May 1996.

P.J. Green and B.W. Silverman, School of Mathematics, University of Bristol, UK, "Nonparametric Regression and Generalized Linear Models", Chapman & Hall, First Edition 1994, Copyright 1994 P.J. Green and B.W. Silverman, ISBN 0 412 30040 0; pp. 156-159.

Thomas F. Coleman and Yuying Li, Computer Science Department, Cornell University, Ithaca, New York 14853, USA, Center for Applied Mathematics, Cornell University, Ithaca, New York 14853, USA, "On the convergence of Interior-Reflective Newton Methods for Nonlinear Minimization Subject to Bounds," 0025-5610 Copyright 1994—The Mathematical Programming Society, Inc., SSDI 0025-5610(94)00028-R, revised manuscript, pp. 189-224.

Ilya Gluhovsky, Sun Microsystems Laboratories, Menlo Park, CA 94025, "Smooth Isotonic Additive Interaction Models With Application to Computer System Architecture Design," Technometrics; May 2006, vol. 48, No. 2; ABI/INFORM Global, p. 176; pp. 176-192.

Ilya Gluhovsky and David Vengerov, Sun Microsystems Laboratories, Menlo Park, CA 94025, "Contrained Multivariate Extrapolation Models With Application to Computer Cache Rates," Copyright 2007 American Statistical Association and the American Society for Quality Technometrics, May 2007, vol. 49, No. 2; pp. 129-137.

(Continued)

*Primary Examiner* — David Rines
(74) *Attorney, Agent, or Firm* — Fiala & Weaver P.L.L.C.

(57) ABSTRACT

A method of generating an aggregated forecasting landscape for a particular advertiser's bidded term constructs standardized forecasting landscapes for each marketplace, rescales, by the advertiser's clickability in the respective marketplace, each of the standardized landscapes corresponding to the previous appearance of the advertiser's ad in that marketplace and whose appearance was attributed to the bidded term, and adds together the rescaled landscapes, thereby giving the advertiser a more accurate representation of how many total clicks he can expect for his advertisement as a function of how much he is willing/able to pay. In particular, estimation variance is reduced by introducing rank into the construction of the standardized landscapes, which increases the accuracy of the calculations.

16 Claims, 4 Drawing Sheets

OTHER PUBLICATIONS

Ilya Gluhovsky and Alexander Gluhovsky, "Smooth Location—Dependent Bandwidth Selection for Local Polynomial Regression," Copyright 2007 American Statistical Association and the American Society for Quality Technometrics, May 2007, vol. 102, No. 478, pp. 718-725.

* cited by examiner

METHOD FOR GENERATING FORECASTING LANDSCAPES

BACKGROUND

1. Field of the Invention

Aspects of the present invention relate generally to a method for estimating more accurately click v. bid forecasting landscapes in a sponsored search scenario.

2. Description of Related Art

As is known in the art, Generalized Second Price (GSP) auctions are commonly used to sell Internet advertising spots against search engine queries. When a user enters a search query in a search engine, the search engine generally returns both query results and sponsored search results (i.e., advertisements intended to be relevant to the query). Advertisers target their ads based on keywords, phrases, and combinations thereof. When a user clicks on a sponsored search result, he is sent to the advertiser's web page, and the advertiser pays the search engine a fee for the referral.

Because the number of ads that the search engine can show to a user is limited, and because different positions on the search results page have different impacts for advertisers (e.g., if two ads are shown together—one above the other—the top ad is usually more likely to be clicked on, etc.), there should exist a system for allocating the positions to advertisers, and auctions have worked well to solve this problem.

For example, under a GSP auction for a specific term, advertisers submit bids stating the maximum amount of money they are willing to pay for a click from the advertisement shown when that term is used by a user in a search; the ad with the highest bid is generally displayed at the top (i.e., it gets the highest "rank"), with the next-highest bid taking up the slot following the highest-bidded advertisement, etc. The "second price" element comes into effect when a user clicks on an advertisement in position k, where position k is not the top position. In such a case, the advertiser in position k is charged, for each click, an amount equal to (or equal plus some nominal amount, such as, for example, one cent) the next highest bid (i.e., the amount bid for the advertisement in position k−1). Given the multiple positions available, GSP "generalizes" the second price auction.

For an advertiser, striking a balance can be difficult because the optimal bid depends on the number and amounts of the other bids for the same term. The problem is compounded by ever-changing probabilities that an advertisement will be clicked on, and limited budgets. Furthermore, if an advertiser opts in to advanced match, the clicks can potentially come from many disparate marketplaces, in some of which the advertiser may have no, or very limited visibility.

Thus, it would be desirable to offer advertisers a means through which they can more accurately predict the ultimate value, or return-on-investment, of their bids.

SUMMARY

In light of the foregoing, it is a general object of the present invention to provide advertisers with a more accurate forecast of the number of clicks they can expect for their bids, by taking into account both rank and the possibility that their ads may be shown in various and disparate marketplaces.

BRIEF DESCRIPTION OF THE DRAWING FIGURES

DETAILED DESCRIPTION

Figure 1:
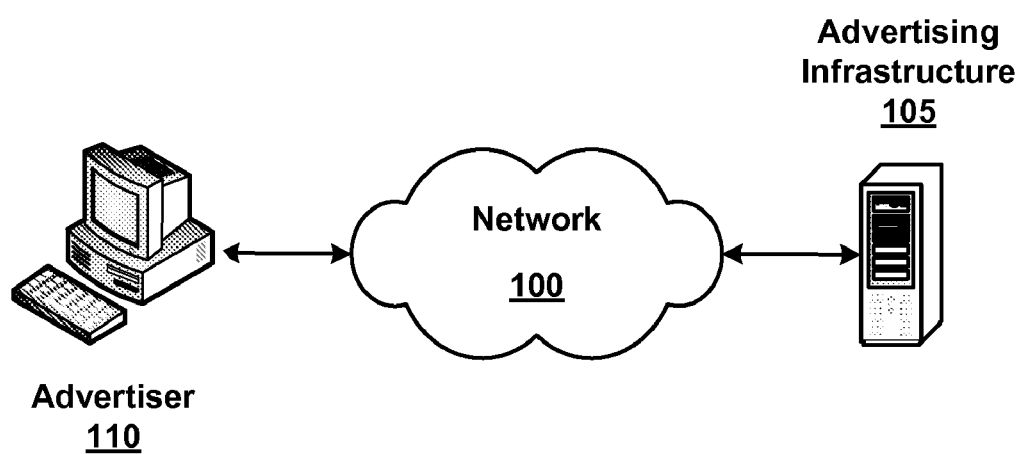
FIG. 1 is a simplified block diagram illustrating how the invention may be employed in accordance with the detailed description.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of giving advertisers a more accurate view of what their bids are ultimately worth in terms of an estimated number of clicks.

Throughout this disclosure, reference is made to "system," which is used to denote an advertising infrastructure through which an Internet advertising network operates (e.g., Yahoo's® Publisher Network, etc.). There are currently numerous advertising infrastructures (e.g., those run by Yahoo!®, Google™, etc.) and most offer similar services, such as, for example, the serving of advertisements; "serving," as understood in the art, is the mechanism by which advertisements are delivered to web pages. The advertising infrastructure is linked to a search engine, which displays search results together with possibly relevant advertisements bought against the search ("sponsored search results"). Advertising infrastructures also may be able to give advertisers an estimate of how many clicks their advertisements will foster, as detailed herein.

FIG. 1 is a simplified functional block diagram illustrating the general architecture of one embodiment of the invention. Advertising infrastructure 105 may be an advertising network already in place (as described above) and may include any of a number of servers, databases, etc. required for its operation; advertising infrastructure 105 also may power the methods used to generate click v. bid graphs, as described herein. Advertiser 110 is the person(s) in charge of buying advertisements to be shown on search results pages. Advertising infrastructure 105 and Advertiser 110 are linked together through Network 100 (e.g., the Internet, etc.).

Throughout this description, a "query" denotes a search query given by a user when performing a search through a search engine. It will be understood that a query comprises terms (or keywords), and may contain a single term, multiple terms, a phrase of terms, etc. For purposes of this invention, permutations and combinations of multiple terms and phrases are not critical. Also, a "marketplace" is defined by a query that has actually been entered by a user (i.e., searches for "tennis," "rackets," and "tennis rackets," define three distinct marketplaces).

Throughout this description, reference is made to "exact match," which is used to denote an advertising model wherein an advertiser purchases ads against a term, but only when that term is entered exactly as purchased. For example, an advertiser may purchase an ad slot for the phrase, "tennis rackets." If a user subsequently searches for the phrase "tennis rackets," he may be shown the advertiser's ad; but, if the user searches for just "tennis," he will not be shown the advertiser's ad.

Conversely, "advanced match," as used throughout this description, denotes an advertising model wherein an advertiser purchases ads against a term, even if the user's query is not exactly the same as the purchased term. For example, an advertiser may purchase the term "tennis rackets," and because he has opted in to advanced match, his ad may be shown against a search for just "tennis" (i.e., without "rackets"), or "tennis shoes," etc. Whether a particular query will generate a match in an advanced match situation is not critical to the invention.

In a Generalized Second Price (GSP) auction, an advertiser chooses a collection of terms for which to submit bids—generally a single bid for each term—and the higher the bid, the better rank the ad gets to occupy when displayed. "Rank" or "position," as used throughout this disclosure, denotes the order in which ads are displayed on a web page. For example, if there are four ads displayed together on a page (i.e., grouped, and separate from the actual content of the page), then an ad's rank is its position in the group (i.e., the top ad has rank "1, " the second-to-top ad has rank "2, " etc.).

In some cases, as here, the rank may be determined by more than just the highest bid, such as, for example, by "bidecpm," which is the product of the bid and the advertiser's clickability. Clickability, insofar as it is used to rescale the forecasting landscape (as detailed herein), may be defined as an advertiser "quality score" with an approximate property that advertisers with scores $clickability_1(q)$ and $clickability_2(q)$, for query q, are expected to get a click-through rate (CTR; i.e., the number of times an ad is clicked on vs. how many times it is displayed) ratio consistent with $CTR_1(q,r)/CTR_2(q,r)$ =$clickability1(q)/clickability_2(q)$, upon the advertisement being placed into any rank r (independently).

Notwithstanding the quality of the advertisement, the top bid generally gets more clicks because users tend to click on higher-ranked ads more than lower-ranked ads; because advertisers are racing to the top, the ads can become quite expensive and the advertiser cannot be sure that his bid was only what was needed to get the top rank (i.e., that he did not overbid).

Currently, to give an advertiser confidence in his bid, he may request that a forecast be generated—essentially a two-dimensional graph—showing how many clicks a typical ad displayed for a given bidded term (i.e., a term paid for by advertisers) will receive as a function of a typical advertiser's bid. The axes of the graph may then be rescaled by the advertiser's clickability (the clicks axis may be rescaled by some other measure of goodness of a query-ad pair) to produce a forecasting landscape.

The current methods can be improved in two ways: (1) use a monotone conditional density estimation model (using either a rigorous nonparametric method or a maximum likelihood estimation (MLE) method) to estimate the distribution of rank vs. bid, together with the regression function of click vs. rank, and then rigorously combine them into a click vs. bid landscape curve; and (2) more accurately account for the "advanced match" situation (i.e., where the advertiser purchases a term for which matches need not be exact).

The invention requires the observation of two separate, but related effects, namely that the bid determines the rank, and the rank affects the clicks; thus, the bid affects the clicks only insofar as it determines the rank. Further, a high bidecpm generally leads to a high (low-numbered) rank, and a high rank results in more adjusted clicks (i.e., where rank, clickability and other factors are taken into account). The two effects are independent in that user behavior depends on the bidecpm only insofar as the latter affects the rank.

As an example of why measuring the effects separately is useful, consider the following scenario: there is a large top bid from a first advertiser and the advertisement associated with the bid appears 50% of the time, because of general bids and other changes (e.g., clickability, whether the advertiser has opted in to advanced match, advertiser population, etc.). If a second advertiser takes the second slot during the 50% of the time the first advertiser takes the first slot, but gets the first slot otherwise, the proposed model would compute the same number of clicks for any bid lower than the top large bid, because smaller changes to that bid would not alter the rank. However, if the previous model was used (i.e., click vs. bid, without taking rank into account), it would appear as though one would have to bid $$\frac{SecondLargestBid + LargestBid}{2}$$

to get the number of clicks estimated for the top rank; in reality though, such a bid would get the top rank only 50% of the time.

To reduce the estimation variance, the two effects are measured separately and are then combined using the following equation:

$$p(c \mid b) = p(c, b)/p(b) = \sum_r p(c, b, r)/p(b) = \qquad (1)$$

$$\sum_r p(c \mid b, r) p(r \mid b) p(b)/p(b) = \sum_r p(c \mid r) p(r \mid b)$$

where c is the number of adjusted clicks an ad received during the relevant observation period(s), (i.e., the period(s) over which the data required by equation (1) is collected), b is bidecpm, r is rank, and p(y\x) is the conditional density of Y given X.

In light of equation (1), the estimated number of clicks given bidecpm can be found through the following equation:

$$E(C \mid b) = \sum_r E(C \mid r) p(r \mid b) \qquad (2)$$

where E(y\x) is the conditional expectation of Y given X, and C is the number of adjusted clicks an advertiser can expect for a given bid.

Equation (2) implies that the relationship between clicks and bidecpm can be separated into two independent relationships (as discussed above), namely one between clicks and rank and the other between rank and bidecpm. The separation is helpful for two reasons: (1) interpretability—having models for the two complementary effects allows for a more comprehensive picture of the whole process; and (2) by introducing additional monotonicity restraints, estimation variance is reduced.

As shown above, E(C\b) is modeled as an increasing function of bidecpm (b); similarly, E(C\r) is constrained to be decreasing (rank 1 is highest). E(C\r) is a constrained regression problem and can be solved using standard monotone regression techniques as are known in the art. With the E(C\r) term solvable using known methods, only the p(r\b) term remains.

As discussed above, a higher bidecpm should result in a higher rank, and the proposition can be expressed by constraining P(R≦r\b) to be an increasing function of b for any r (i.e., a higher bidecpm increases the chance to get a rank higher than r for any R). Similar constraints are not available on the conditional density provided by p(r\b).

In one embodiment, the following needs to be modeled, as in monotone regression, to fit $P(R \leq r \backslash b)$ nonparametrically:

$$P(R \leq r \mid b) = \sum_{i,j} \beta_{ij} I_{R,i}(r) I_{B,j}(b) \quad (3)$$

In equation (3), R stands for variable rank, B stands for variable bidecpm, and generic terms $I_{X,k}$ are a monotone spline basis along dimension X satisfying an appropriate constraint; generally, $I_{X,k}$, $1 \leq k \leq N_X$ are increasing basis functions in the direction of X. It will be appreciated that there is no objective function to minimize with respect to the betas ($\beta$). Indeed, the data points do not provide a response value in this density estimation formulation. To rectify the situation, it is observed that:

$$P(r, b) = P\{R \leq r, B \leq b\} = \int_{-\infty}^{b} P\{R \leq r \mid B = b'\} dP(b') \quad (4)$$

Plugging into equation (4) the corresponding empirical distributions for P(r,b) and P(b) (i.e., an empirical distribution of X given sample $x_1 \ldots, x_n$ places the probability of 1/n on each sample point), the following equation is obtained:

$$\frac{1}{n} \sum_{k=1}^{n} 1_{\{r_k \leq r, b_k \leq b\}} \approx \frac{1}{n} \sum_{k=1}^{n} \sum_{i,j} \beta_{ij} I_{R,i}(r) I_{B,j}(b_k) 1_{\{b_k \leq b\}} = \quad (5)$$

$$\frac{1}{n} \sum_{i,j} \beta_{ij} I_{R,i}(r) \sum_{k=1}^{n} I_{B,j}(b_k) 1_{\{b_k \leq b\}}$$

It is assumed that aggregate quantities of $b_{rd}$ have the same weight (where d is the relevant period), and $I_{rd}$ may constitute an appropriate weight; in this case, the empirical distribution places the weight of $$\frac{I_{rd}}{\sum_{r,d} I_{rd}}$$

on data point $b_{rd}$. In the translation of equation (3) to equation (5), the notation of the kth data point $b_{rd}$ changes to $(r_k, b_k)$; the period information is lost in the process as it is not used subsequently.

It is observed that the function of $\beta_{i,j}$ is linear; therefore, and as is known in the art, the squared difference between the right and left sides of equation (5) can serve as a quadratic objective, similar to the least squares fit penalty in regression, and can be similarly augmented with a roughness penalty. The integrated squared difference is taken with respect to the empirical distribution of the data, which amounts to the sum of squared differences over the data locations:

$$\sum_{m=1}^{n} \left( \frac{1}{n} \sum_{k=1}^{n} 1_{\{r_k \leq r_m, b_k \leq b_m\}} - \frac{1}{n} \sum_{i,j} \beta_{ij} I_{R,i}(r_m) \sum_{k=1}^{n} I_{B,j}(b_k) 1_{\{b_k \leq b_m\}} \right)^2 \quad (6)$$

The term to the left of the minus sign and within the parentheses essentially counts how many data points have a rank less than or equal to $r_m$, and whose bid is less than or equal to $b_m$. The term to the right of the minus sign and within the parentheses is a function expressed in terms of the betas ($\beta$), which is meant to keep the equation objective and as small as possible, while still trying to ensure that the fit matches the data to the left of the equals sign.

It will be appreciated that such a sum is more appropriate than other methods, such as, for example, an integral with respect to Lebesque measure drdb, which, in situations where a small region has high probability, gives little weight to small, dense regions and heavy weight to large, sparse regions; thus, other methods act with high precision in sparse regions, which matter less, and with low precision in dense regions, which matter more.

Once $\beta_{ij}$ in equation (3) have been estimated as $\hat{\beta}_{ij}$, p(r\b) is immediately obtained as:

$$p(r \mid b) = P(R = r \mid b) = \quad (7)$$

$$P(R \leq r \mid b) - P(R \leq r - 1 \mid b) = \sum_{i,j} \hat{\beta}_{ij} (I_{R,i}(r) - I_{R,i}(r-1)) I_{B,j}(b)$$

where, by convention, $I_{R,i}(0)=0$ for all i. Equation (7) allows for an estimate of the full conditional probability of rank given bidecpm, as opposed to just the conditional expectation that could be found by regression; the equation can then be used for various inferential purposes regarding the rank vs. bidecpm relationship. In particular, it can be used as part of equation (2) to estimate the conditional distribution of adjusted clicks vs. bidecpm.

Equation (8) is obtained by substituting equation (7) with the p(r\b) term in equation (2); from there, it is possible to solve equation (2) and ultimately arrive at the estimation of clicks vs. bids needed for the forecasting landscape.

$$E(C \mid b) = \sum_{r} E(C \mid r) \sum_{i,j} \hat{\beta}_{ij} (I_{R,i}(r) - I_{R,i}(r-1)) I_{B,j}(b) \quad (8)$$

In another embodiment, $P(R \leq r \backslash b)$ may be modeled using maximum likelihood estimation (MLE), which is often used due to its established asymptotic properties and superior practical results in various settings. A drawback to using MLE for this particular problem is the extensive computational time it requires, due mostly to its use of convex programming (as opposed to quadratic programming as used in the first embodiment), but it generally produces superior results. As a tradeoff, it may be prudent to use MLE for high traffic queries, and the first embodiment for the remainder.

Log-likelihood is more amenable to optimization, and so this approach begins with an exponential model, with nonnegative parameters $\beta_{ij}$:

$$P(R \leq r \mid b) = \exp\left( \sum_{i,j} \beta_{ij} I_{R,i}(r) I_{B,j}(b) \right) \quad (9)$$

To keep $P(R \leq r \backslash b)$ no greater than one, the exponent is restricted to be nonpositive, which is achieved by using negative increasing $I_{R,i}(r)$ and positive decreasing $I_{B,j}(b)$. These constraints also ensure that $P(R \leq r \backslash b)$ is increasing in both r and b; the latter follows from the fact that $I_{R,i}(r)$ is negative, thus, as b increases, $I_{B,j}(b)$ decreases and the exponent becomes "less negative."

The likelihood—as a function of the unknown parameter β, and given the observed bid and rank data—is given by:

$$\prod_k p(r_k, b_k) = \left(\prod_k p(r_k \mid b_k)\right)\left(\prod_k p(b_k)\right) \quad (10)$$

Because $$\left(\prod_k p(b_k)\right)$$

does not depend on model parameters $\beta_{i,j}$, the task is to maximize $$\prod_k p(r_k \mid b_k),$$

or, equivalently:

$$L(\beta) = \sum_k \log(p(r_k \mid b_k)), \quad (11)$$

where L is the objective to be maximized. Each summand in equation (11) is $$\log\left[\exp\left(\sum_{i,j} \beta_{ij} I_{R,i}(r) I_{B,j}(b)\right) - \exp\left(\sum_{i,j} \beta_{ij} I_{R,i}(r-1) I_{B,j}(b)\right)\right], \quad (12)$$

which is generally not concave in $\beta_{ij}$, thus it is not theoretically suitable for convex optimization. Though the problem itself is one of concave maximization, it will be appreciated that concave maximization is equivalent to convex minimization upon applying the latter to minus the original objective. In light of this equivalence, and to make the problem convex, equation (11) can be approximated by accounting separately for the cases where $r_k=1$, and where $r_k>1$. If $r_k=1$, no approximation is necessary, because $$p(r_k = 1 \mid b_k) = \exp\left(\sum_{i,j} \beta_{ij} I_{R,i}(r) I_{B,j}(b)\right), \quad (13)$$

whose logarithm is concave (indeed, linear). For $r_k>1$, $$\begin{aligned} p(r_k \mid b_k) &= P(R \le r_k \mid b_k) - P(R \le r_k - 1 \mid b_k) \quad (14) \\ &= \exp\left(\sum_{i,j} \beta_{ij} I_{R,i}(r) I_{B,j}(b)\right) - \\ &\quad \exp\left(\sum_{i,j} \beta_{ij} I_{R,i}(r-1) I_{B,j}(b)\right) \\ &\approx \left.\frac{\partial \exp\left(\sum_{i,j} \beta_{ij} I_{R,i}(r) I_{B,j}(b)\right)}{\partial r}\right|_{r-\frac{1}{2}} \\ &= \exp\left(\sum_{i,j} \beta_{ij} I_{R,i}\left(r-\frac{1}{2}\right) I_{B,j}(b)\right) \times \\ &\quad \exp\sum_{i,j} \beta_{ij} I'_{R,i}\left(r-\frac{1}{2}\right) I_{B,j}(b) \quad (15) \end{aligned}$$

It will be appreciated that the logarithm of (15) is concave because the product of the two terms becomes a sum whose first term is linear and whose second term is a logarithm of a positive linear combination (i.e., $I'_{R,i} \geq 0$). I-splines are piecewise polynomials, and thus their differentiation straightforward; therefore, the gradient and the Hessian of the likelihood objective is computed through various ways known in the art (e.g., a subspace trust region method based on the interior-reflective Newton method, etc.).

Similar to the first embodiment, equation (16) is obtained by substituting equation (15) with the p(r\b) term in equation (2); from there, it is possible to solve equation (2) and ultimately arrive at the estimation of clicks vs. bids needed for the forecasting landscape.

$$E(C \mid b) = \sum_r E(C \mid r) \left[\exp\left(\sum_{i,j} \beta_{ij} I_{R,i}\left(r - \frac{1}{2}\right)\right) I_{B,j}(b)\right) \times \exp\sum_{i,j} \beta_{ij} I'_{R,i}\left(r - \frac{1}{2}\right) I_{B,j}(b)\right] \quad (16)$$

Using equation (8) or (16) together with various other data, the system can generate forecasting landscapes tailored to a particular advertiser's past performance in multiple, related marketplaces, and thereby give him a more accurate view of what he can expect going forward.

For each advertiser and each of his bidded terms, the following is maintained: (1) the list of marketplaces for which the ad appears and whose appearance is attributed to the bidded term; and (2) the corresponding historical clickabilities, specific to the advertiser and the marketplace.

For each marketplace (defined by a historical query, as explained above) and each rank (i.e., ad slot), and over the relevant period(s) (e.g., days, weeks, months, etc.), the following is maintained: (1) number of impressions (i.e., the number of times corresponding advertisements are actually presented on a page); (2) number of clicks (i.e., the number of times the corresponding advertisements are actually clicked on by users); (3) the sum of the products of the respective bids and clickabilities (i.e., bidecpm); and (4) the sum of the clickabilities.

Figure 2:
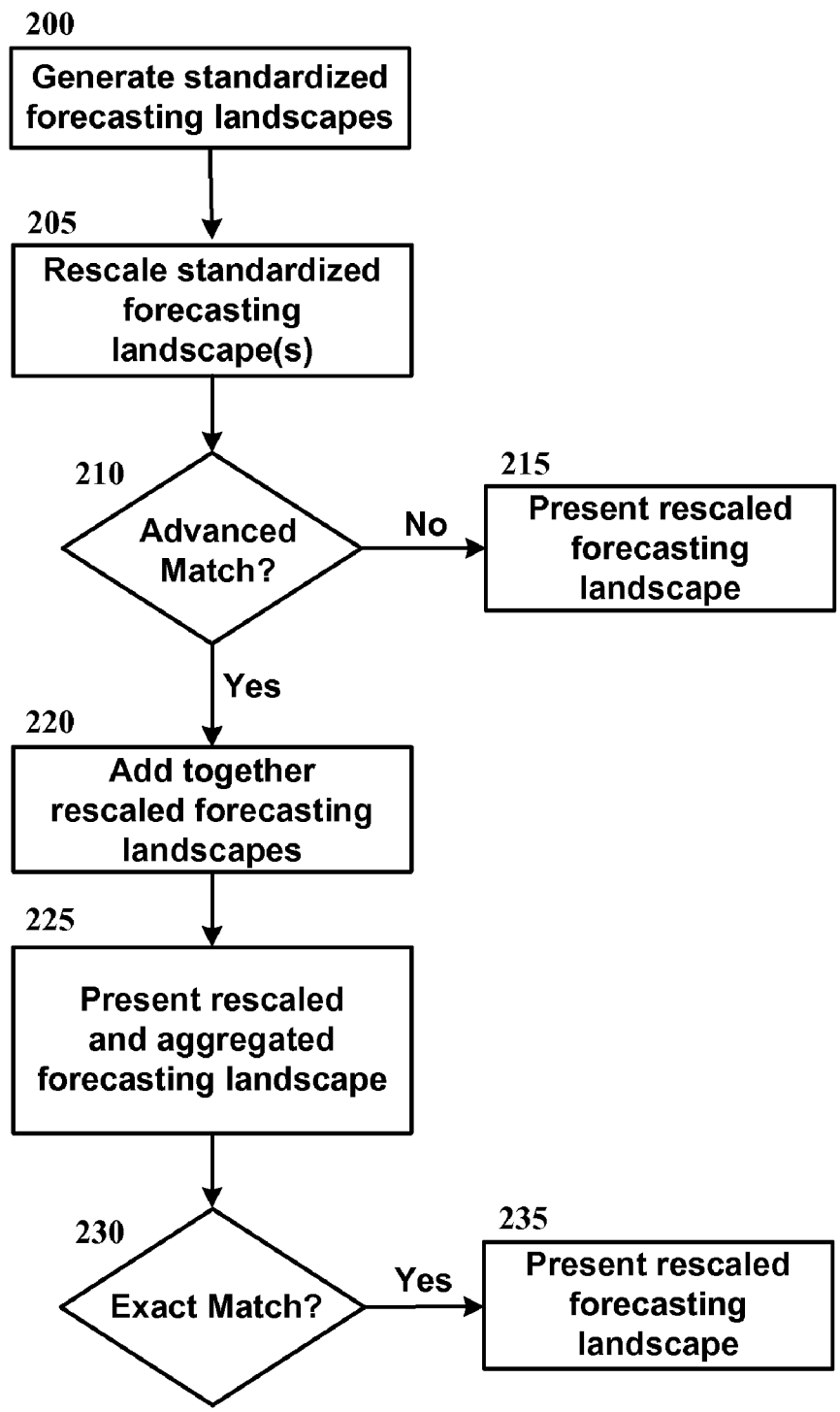
FIG. 2 is a logical flowchart of the general process by which an aggregated forecasting landscape may be generated.
Figure 3A:
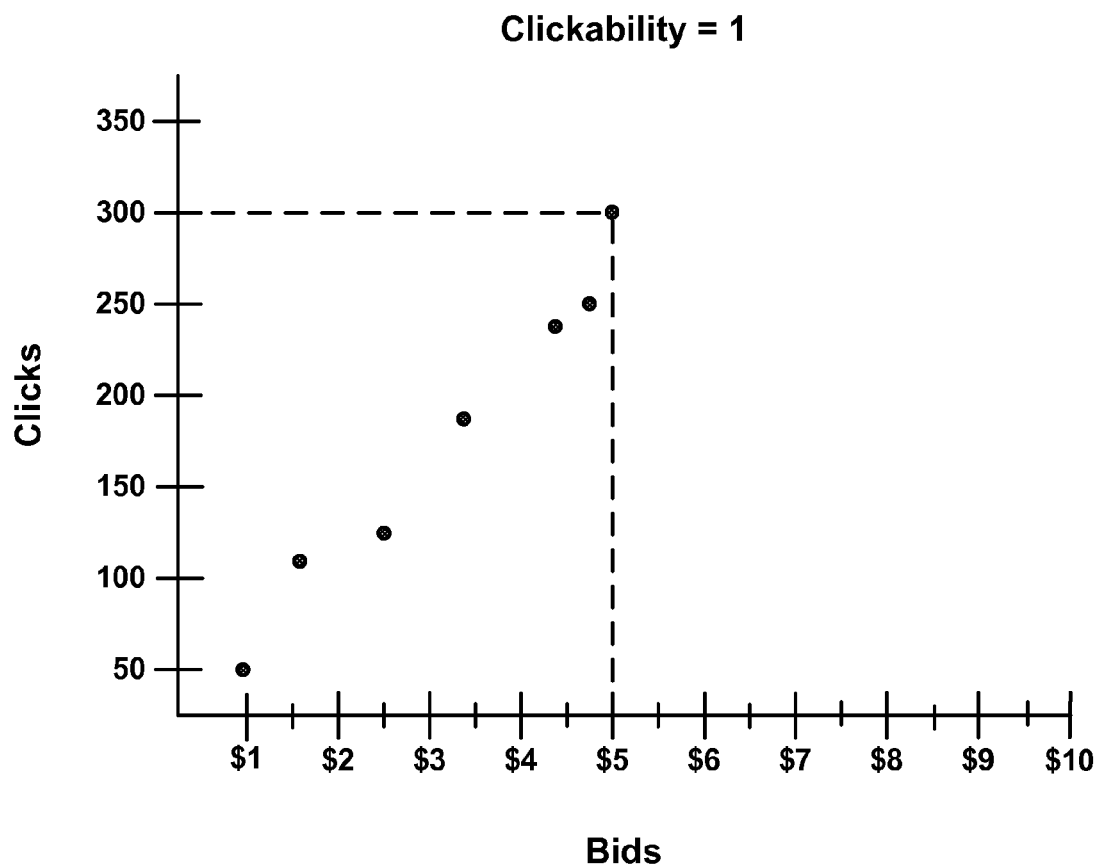
FIGS. 3A-3B illustrate generally the rescaling of a standardized forecasting landscape.
Figure 3B:
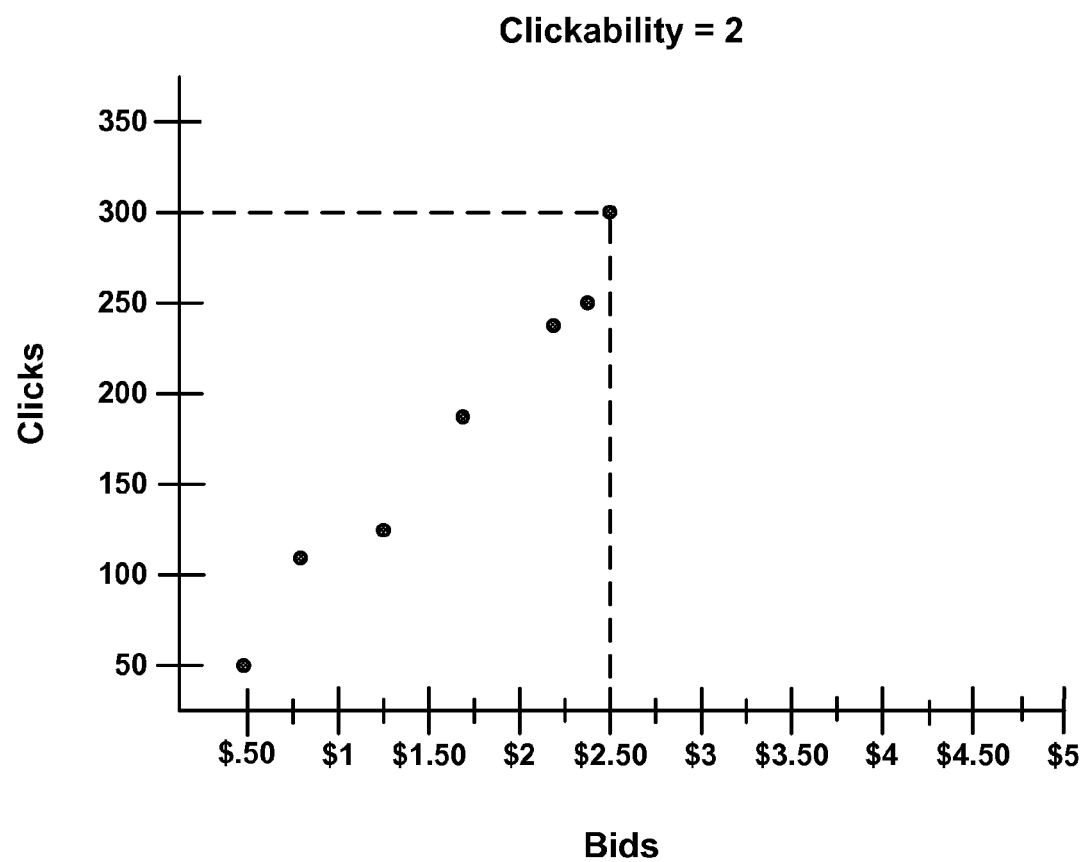

FIG. 2 is a logical flowchart of the general process by which an aggregated forecasting landscape may be generated, and FIGS. 3A-3B illustrate generally the rescaling of a standardized forecasting landscape for a particular advertiser; these figures will be discussed together throughout the remainder of the disclosure.

As illustrated at block 200, standardized (or normalized) forecasting landscapes for each marketplace may be constructed offline (e.g., before an advertiser requests that a forecasting landscape be created); such a forecasting landscape is generated by solving equation (8) or (16). If there are too many marketplaces (i.e., it is taking longer than desired to calculate all of them, etc.), various workarounds may be employed, generally without disrupting (or disrupting only very slightly) the accuracy of the method. For example, marketplaces with low click/impression volume may be discarded, or only the marketplaces that account for some threshold number of the clicks (e.g., 90%) may be accounted for, etc. As shown in FIG. 3A, the forecasting landscapes are generated assuming a certain clickability (e.g., the graph may be constructed using a clickability of 1), which ensures that they are standardized across each marketplace.

The graphs are generally increasing in terms of bids and clicks (i.e., the higher the bid, the more clicks the advertiser can usually expect), and this functional relationship is shown in FIG. 3A. The forecasting landscape in FIG. 3A clearly shows that, for example, and in this particular marketplace, an advertiser with a clickability of 1 can expect around 300 clicks for a bid of $5.

At block 205, the system "loads," for the particular advertiser and the particular term he is currently interested in, the list of marketplaces for which the ad appears and whose appearance is attributed to that bidded term, along with the advertiser's corresponding, historical clickability in each marketplace. It will be appreciated that the method used to determine which bidded term is responsible for the appearance of the ad is not critical to the invention. For example, if a marketplace which an advertiser is in (through, for example, advanced match), is defined by the word "tennis rackets," and the advertiser bid on both "tennis" and "rackets," it is not relevant to the invention how the system determined that the advertiser was in the "tennis rackets" marketplace (i.e., because of "tennis" or because of "rackets").

The standardized landscapes for each of the marketplaces corresponding to the bidded term, that were generated at block 200, and are now "loaded" in the system, are rescaled by the advertiser's clickability in that particular marketplace (the rescaling is mandatory for the bid axis, and optional for the click axis). As an example, consider an advertiser with clickability 2 in a particular marketplace. As discussed above regarding FIG. 3A, the standardized forecasting landscape for this particular marketplace is generated assuming a clickability of 1, which shows generally how many clicks an advertisement with a particular bid can be expected to foster. In view of FIG. 3A—where it was shown that an advertiser with a clickability of 1 needs to bid $5 to receive approximately 300 clicks—an advertiser with a clickability of 2 needs to bid only $2.50 to receive approximately the same 300 clicks, because his clickability is twice as good as the typical/average of 1. Therefore, the graph is rescaled to account for the advertiser's greater clickability, as shown in FIG. 3B (i.e., if bids are represented by the x-axis, then the location on the x-axis where $5 falls is replaced with $2.50, etc.).

At block 210, the system checks to see whether the advertiser is requesting a forecasting landscape for advanced match, and if true, the rescaled landscapes corresponding to advanced match are added together at block 220, such that an "aggregated" forecasting landscape may be presented to the advertiser at block 225. The aggregated graph allows the advertiser to see how many total clicks he can expect for his bid, across all marketplaces into which his bidded term reaches. For example, if an advertiser previously paid for "tennis," and opted in to advanced match, his ad may have been shown next to searches for "tennis," "tennis balls," and "tennis rackets." After taking into account the advertiser's average clickability in each marketplace, the system has a good estimation of how many clicks the advertisement will receive in each marketplace in the near future (i.e., as shown by the rescaled forecasting landscape for each marketplace, as discussed above). Assume that block 205 determines that the "tennis" marketplace will receive 100 clicks for a $1 bid, that "tennis balls" will receive 300 clicks for a $1 bid, and that "tennis rackets" will receive 500 clicks for a $1 bid. With this information, the aggregated forecasting landscape will indicate to the advertiser that, with a bid of $1, he can expect to generate 900 clicks (i.e., 100+300+500).

Where the user is not requesting advanced match, but instead is requesting only exact match, there is just one forecasting landscape to present (i.e., the one belonging to the bidded query), as shown at block 215. It will be appreciated that an advanced match requestor may also wish to see results for exact match; such a case is handled at blocks 230 and 235.

In summary, at blocks 215, 225, and 235, the forecasting landscape(s) is presented to the advertiser so that he can make a more informed decision as to what he is willing to pay for his advertisement, and what number of clicks he can expect to garner.

It will be appreciated that the solution easily handles changes in the advertiser's bidded terms. For example, if an advertiser decides to bid on another term directly instead of using advanced match to reach that particular marketplace, the corresponding clicks will become attributed to the new bidded term, but the standardized forecasting landscapes will remain valid (though they may shift slightly due to various factors, such as, for example, clickability, etc.).

The sequence and numbering of blocks depicted in FIG. 2 is not intended to imply an order of operations to the exclusion of other possibilities. Those of skill in the art will appreciate that the foregoing systems and methods are susceptible of various modifications and alterations.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of estimating a click-through rate for a bidded term at a bid amount by generating a standardized forecasting landscape for the bidded term in a single marketplace using data collected over at least one relevant period, said method comprising:
for each of a plurality of ranks:
calculating, by a server, a conditional expectation of the number of clicks given the rank;
calculating, by the server, a probability distribution of the rank given at least one of a plurality of bidecpms; and
multiplying the calculated conditional expectation of the number of clicks by the calculated probability distribution of the rank;
generating a bid forecast based on said multiplying by:
assigning at least one of the plurality of bidecpms a value associated with an expected number of clicks;
generating the bid forecast given said assigned value by summing, over the plurality of ranks, the result of said multiplying; and
determining an advertiser bid amount based on said bid forecast.

2. The method of claim 1 wherein:
a monotone regression model is used for the conditional expectation calculation; and
a monotone conditional density estimation model is used for the probability distribution calculation.

3. The method of claim 2 further comprising fitting the monotone conditional density estimation model for $P(R \leq r|b)$ by solving a quadratic program according to the following equation:

$$P(R \leq r|b) = \sum_{i,j} \beta_{ij} I_{R,i}(r) I_{B,j}(b),$$

wherein:
R is a variable rank;
B is a variable bidecpm;
b is a bidecpm;

r is a rank;

β is a regression coefficient to be fitted in the equation;

$I_{R,i}$, $1 \leq i \leq N_R$ is an increasing basis function in the direction of rank; and $I_{B,j}$, $1 \leq j \leq N_B$ is an increasing basis function in the direction of bidecpm.

4. The method of claim 3 wherein said fitting further comprises substituting the fitted regression coefficients into the following equation:

$$\sum_{i,j} \hat{\beta}_{ij}(I_{R,i}(r) - I_{R,i}(r-1))I_{B,j}(b),$$

wherein $\hat{\beta}$ is a regression coefficient, as fitted.

5. The method of claim 2 further comprising fitting the monotone conditional density estimation model for $P(R \leq r|b)$ through maximum likelihood estimation by solving a convex program according to the following equation:

$$P(R \leq r | b) = \exp\left(\sum_{i,j} \beta_{ij} I_{R,i}(r) I_{B,j}(b)\right),$$

wherein:

R is a variable rank;

B is a variable bidecpm;

B is a bidecpm;

r is a rank;

β is a nonnegative regression coefficient to be fitted in the equation;

$I_{R,i}$, $1 \leq i \leq N_R$ is a negative increasing basis function in the direction of rank; and $I_{B,j}$, $1 \leq j \leq N_B$ is a positive decreasing basis function in the direction of bidecpm.

6. The method of claim 5 wherein the likelihood is given by the following equation:

$$\prod_k p(r_k, b_k) = \left(\prod_k p(r_k | b_k)\right)\left(\prod_k p(b_k)\right),$$

$$\prod_k p(r_k | b_k)$$

and wherein the term is maximized using an equivalent equation:

$$L(\beta) = \sum_k \log(p(r_k | b_k)),$$

where L is the objective to be maximized.

7. The method of claim 6 further comprising ensuring that the equivalent equation is concave when $r_k > 1$ by approximating the solution according to the following equation:

$$p(r_k | b_k) = \exp\left(\sum_{i,j} \beta_{ij} I_{R,i}\left(r - \frac{1}{2}\right) I_{B,j}(b)\right) \times \exp\sum_{i,j} \beta_{ij} I'_{R,i}\left(r - \frac{1}{2}\right) I_{B,j}(b).$$

8. The method of claim 1 further comprising plotting, on a graph, the at least one bidecpm and its associated number of clicks.

9. A method of estimating a click-through rate for a bidded term at a bid amount by generating a standardized forecasting landscape for the bidded term in a single marketplace using data collected over at least one relevant period, said method comprising:

for each of a plurality of ranks:

calculating, by a server, a conditional expectation of the number of clicks given the rank;

calculating, by the server, a probability distribution of the rank given at least one of a plurality of bidecpms; and multiplying the calculated conditional expectation of the number of clicks by the calculated probability distribution of the rank;

generating a bid forecast based on said multiplying by:

assigning at least one of the plurality of bidecpms a value associated with a quality score of an advertiser;

generating the bid forecast given said assigned value by summing, over the plurality of ranks, the result of said multiplying; and determining an advertiser to bid amount based on said bid forecast.

10. The method of claim 9 wherein:

a monotone regression model is used for the conditional expectation calculation; and a monotone conditional density estimation model is used for the probability distribution calculation.

11. The method of claim 10 further comprising fitting the monotone conditional density estimation model for $P(R \leq r|b)$ by solving a quadratic program according to the following equation:

$$P(R \leq r | b) = \sum_{i,j} \beta_{ij} I_{R,i}(r) I_{B,j}(b),$$

wherein:

R is a variable rank;

B is a variable bidecpm;

b is a bidecpm;

r is a rank;

β is a regression coefficient to be fitted in the equation;

$I_{R,i}$, $1 \leq i \leq N_R$ is an increasing basis function in the direction of rank; and $I_{B,j}$, $1 \leq j \leq N_B$ is an increasing basis function in the direction of bidecpm.

12. The method of claim 11 wherein said fitting further comprises substituting the fitted regression coefficients into the following equation:

$$\sum_{i,j} \hat{\beta}_{ij}(I_{R,i}(r) - I_{R,i}(r-1))I_{B,j}(b),$$

wherein $\hat{\beta}$ is a regression coefficient, as fitted.

13. The method of claim 10 further comprising fitting the monotone conditional density estimation model for $P(R \leq r|b)$ through maximum likelihood estimation by solving a convex program according to the following equation:

$$P(R \leq r | b) = \exp\left(\sum_{i,j} \beta_{ij} I_{R,i}(r) I_{B,j}(b)\right),$$

wherein:
R is a variable rank;
B is a variable bidecpm;
B is a bidecpm;
r is a rank;
$\beta$ is a nonnegative regression coefficient to be fitted in the equation;
$I_{R,i}$, $1 \leq i \leq N_R$ is a negative increasing basis function in the direction of rank; and
$I_{B,j}$, $1 \leq j \leq N_B$ is a positive decreasing basis function in the direction of bidecpm.

14. The method of claim 13 wherein the likelihood is given by the following equation:

$$\prod_k p(r_k, b_k) = \left(\prod_k p(r_k | b_k)\right)\left(\prod_k p(b_k)\right),$$

$$\prod_k p(r_k | b_k)$$

and wherein the term is maximized using an equivalent equation:

$$L(\beta) = \sum_k \log(p(r_k | b_k)),$$

where L is the objective to be maximized.

15. The method of claim 14 further comprising ensuring that the equivalent equation is concave when $r_k > 1$ by approximating the solution according to the following equation:

$$p(r_k | b_k) = \exp\left(\sum_{i,j} \beta_{ij} I_{R,i}\left(r - \frac{1}{2}\right) I_{B,j}(b)\right) \times \exp\sum_{i,j} \beta_{ij} I'_{R,i}\left(r - \frac{1}{2}\right) I_{B,j}(b).$$

16. The method of claim 9 further comprising plotting, on a graph, the at least one bidecpm and its associated number of clicks.

* * * * *

UNITED STATES PATENT AND TRADEMARK OFFICE
CERTIFICATE OF CORRECTION

PATENT NO. : 8,296,177 B2
APPLICATION NO. : 12/034616
DATED : October 23, 2012
INVENTOR(S) : Ilya Gluhovsky et al.

It is certified that error appears in the above-identified patent and that said Letters Patent is hereby corrected as shown below:

On the Title Page

Column 2, item (56) under "OTHER PUBLICATIONS", line 19, before "Multivariate" replace "Contrained" with --Constrained--.

In the Claims

In column 11, claim 6, around line 48, delete "$\coprod_k p(r_k | b_k)$".

In column 11, claim 6, line 50, after "and wherein the" insert -- $\coprod_k p(r_k | b_k)$ --.

In column 12, claim 9, line 28, after "advertiser" delete "to".

In column 13, claim 14, last line, delete "$\coprod_k p(r_k | b_k)$".

In column 14, claim 14, line 1, after "and wherein the" insert -- $\coprod_k p(r_k | b_k)$ --.

Signed and Sealed this
Twenty-third Day of June, 2015

Michelle K. Lee
*Director of the United States Patent and Trademark Office*